United States Patent
Atreya et al.

(10) Patent No.: US 10,680,885 B2
(45) Date of Patent: *Jun. 9, 2020

(54) MDNS SUPPORT IN UNIFIED ACCESS NETWORKS

(71) Applicant: Extreme Networks, Inc., San Jose, CA (US)

(72) Inventors: Vivek Lakshminarayana Atreya, Bangalore (IN); Shashi Hosakere Ankaiah, Bangalore (IN); Pavan Kumar C S, Bangalore (IN); Poornima Munirajaiah, Bangalore (IN); Umesh Vidyaranyapura Lakshminarayana, Bangalore (IN)

(73) Assignee: Extreme Networks, Inc., San Jose, CA (US)

(*) Notice: Subject to any disclaimer, the term of this patent is extended or adjusted under 35 U.S.C. 154(b) by 132 days.

This patent is subject to a terminal disclaimer.

(21) Appl. No.: 15/787,469

(22) Filed: Oct. 18, 2017

(65) Prior Publication Data

US 2018/0041389 A1     Feb. 8, 2018

Related U.S. Application Data

(63) Continuation of application No. 13/924,570, filed on Jun. 22, 2013, now Pat. No. 9,806,945.

(51) Int. Cl.
*H04L 12/24* (2006.01)

(52) U.S. Cl.
CPC ...... *H04L 41/0809* (2013.01); *H04L 41/0886* (2013.01); *H04L 41/5058* (2013.01)

(58) Field of Classification Search
None
See application file for complete search history.

(56) References Cited

U.S. PATENT DOCUMENTS

| | | | |
|---|---|---|---|
| 8,724,517 B1* | 5/2014 | Bulusu | H04L 45/48 370/254 |
| 2004/0042454 A1* | 3/2004 | Zabihi | H04L 12/4641 370/392 |
| 2004/0258074 A1 | 12/2004 | Williams et al. | |
| 2010/0070600 A1 | 3/2010 | Schulzrinne et al. | |
| 2010/0071024 A1 | 3/2010 | Eyada | |
| 2010/0290445 A1* | 11/2010 | Ankaiah | H04L 12/4633 370/338 |
| 2011/0131338 A1 | 6/2011 | Hu | |
| 2012/0014387 A1 | 1/2012 | Dunbar et al. | |
| 2012/0106523 A1 | 5/2012 | Anumala et al. | |
| 2012/0110393 A1 | 5/2012 | Shieh et al. | |
| 2013/0083700 A1 | 4/2013 | Sindhu et al. | |
| 2013/0145153 A1* | 6/2013 | Brown | G06F 21/6263 713/156 |
| 2013/0311661 A1 | 11/2013 | McPhee | |
| 2014/0012967 A1 | 1/2014 | Agarwal et al. | |
| 2014/0073289 A1 | 3/2014 | Velasco | |
| 2014/0241368 A1 | 8/2014 | Suzuki et al. | |
| 2014/0269703 A1* | 9/2014 | Sundaresan | H04L 45/04 370/390 |
| 2014/0281669 A1 | 9/2014 | DeCusatis et al. | |

(Continued)

*Primary Examiner* — Brandon M Renner
(74) *Attorney, Agent, or Firm* — Sterne, Kessler, Goldstein & Fox P.L.L.C.

(57) ABSTRACT

Methods, systems and computer readable media for mDNS support in unified access networks are described.

18 Claims, 5 Drawing Sheets

(56) References Cited

U.S. PATENT DOCUMENTS

2015/0188880 A1* 7/2015 Kitamura .............. H04L 61/103
709/223
2017/0215129 A1* 7/2017 McCann ............... H04W 48/08
2019/0044822 A1* 2/2019 Gast ........................ H04L 41/12

* cited by examiner

MDNS SUPPORT IN UNIFIED ACCESS NETWORKS

CROSS-REFERENCE TO RELATED APPLICATIONS

This application is a continuation application of U.S. patent application Ser. No. 13/924,570, filed Jun. 22, 2013, now allowed. The entire contents of which are hereby incorporated by reference herein.

TECHNICAL FIELD

Embodiments relate generally to computer networks, and more particularly, to methods, systems and computer readable media for mDNS support in unified access networks.

BACKGROUND

Zero configuration networking (or zeroconf) is a group of technologies that can include service discovery, address assignment, and hostname resolution. Apple Computer Corporation's Bonjour zero configuration networking technology locates devices such as printers, other computers, and the services that those devices offer on a local network using multicast Domain Name System (mDNS) service records.

The mDNS service may be suitable for small, single networks, but may not be suited for larger enterprises having multiple networks. A need may exist for selective intelligent relaying of service discovery packets across a network. Further, some memory constrained wireless access points (APs) and/or low-end unified switches.

Embodiments were conceived in light of the above mentioned needs, problems and/or limitations, among other things.

SUMMARY

One or more embodiments can include methods, systems and computer readable media for mDNS support in unified access networks. In some implementations, the method can include starting a zero configuration protocol agent on a switch and electing one switch of a group of switches to be a gateway switch for a network. The method can also include synchronizing service records from the gateway switch to the other switches in the group of switches and learning, at the gateway switch, a new service from a peer gateway switch. The method can further include relaying information about the new service from the gateway switch to other switches in the group of switches and providing stored service records from the gateway switch in response to a service discovery request message. The service discovery request message can be an mDNS message.

The method can further include monitoring, at one of the switches, service discovery request messages and responses to learn available services and sending a copy of the available services to a wireless controller. The method can further include detecting, at the one switch, a service discovery request and sending a message from the one switch to the wireless controller requesting the available services. The method can also include receiving a response from the wireless controller, framing the response in a service request protocol format and sending the framed response on a network. The copy of the available services can be sent via a unicast message.

DETAILED DESCRIPTION

While some specific zero configuration network protocols, such as Apple's Bonjour, are discussed below to help illustrate various features, it will be appreciated that the systems, methods and computer readable media described herein can be configured to work with other zero configuration protocols or technologies.

Figure 1:
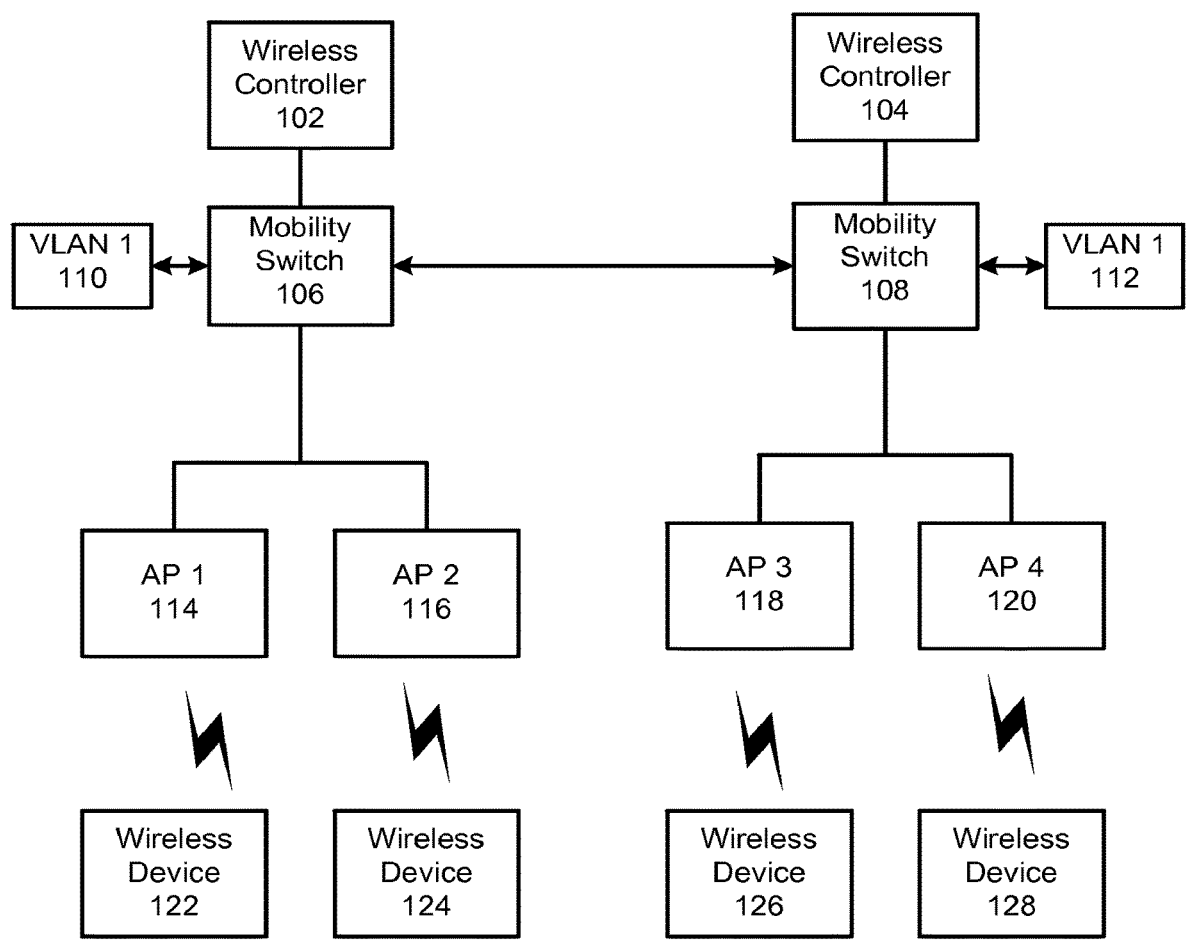
FIG. 1 is a diagram of an example network in accordance with at least one implementation.

As shown in FIG. 1, an example wireless network 100 (e.g., enterprise WLANs) includes wireless controllers (102 and 104) connected to respective mobility switches (or unified switches) 106 and 108. Each mobility switch (106 and 108) is connected to a respective VLAN (or MVLAN) 110, 112 and serves as the gateway for its corresponding VLAN (there can be more than one mobility switch or unified switch in each VLAN, but only one per VLAN will be designated as the gateway). Access points 114-120 are connected to corresponding unified switches 106, 108. Client devices 122-128 connect to the network via one of the access points 114-120.

In operation, the mobility switches (106 and 108) can receive a service filter configuration from an admin or other system (e.g., from a corresponding wireless controller 102/104) and filter based on a user defined set of services. A Bonjour (e.g., zeroconf) service advertisement can be sent from a client device (e.g., 128) to the mobility switch 108 via AP 4 120. Mobility switch 108 can sync service records with mobility switch 106, which caches (or stores) the services advertised by mobility switch 108.

A client device (e.g., 122) sends a service discovery request (e.g., via mDNS) to mobility switch 106 via AP 1 114. The mobility switch 106 sends a response framed as an mDNS response.

Figure 2:
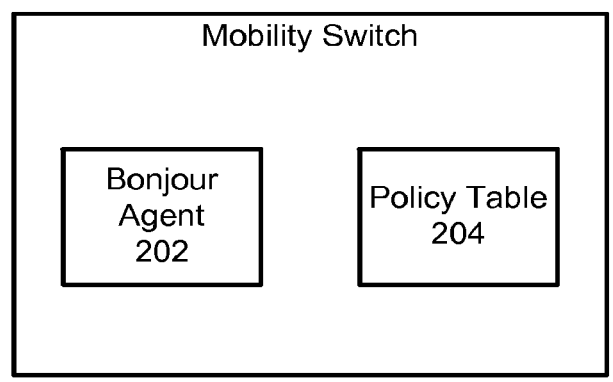
FIG. 2 is a diagram of an example unified switch (or mobility switch) in accordance with at least one implementation.

As shown in FIG. 2, a mobility switch (e.g., 106 and/or 108) can include a Bonjour agent 202 and a policy table 204. The Bonjour agent 202 is discussed for illustration purposes and can be an agent for any zeroconf protocol.

The policy table 204 can store end user privileges associated with the Bonjour (or other zeroconf) services to permit policy-based end user privilege permissions. For example, by using the policy-based end user privileges, network administrators can select which services that may need to be relayed and advertised across which networks. The bonjour agents (e.g., 202) handle the relaying of the selected services across the network.

Figure 3:
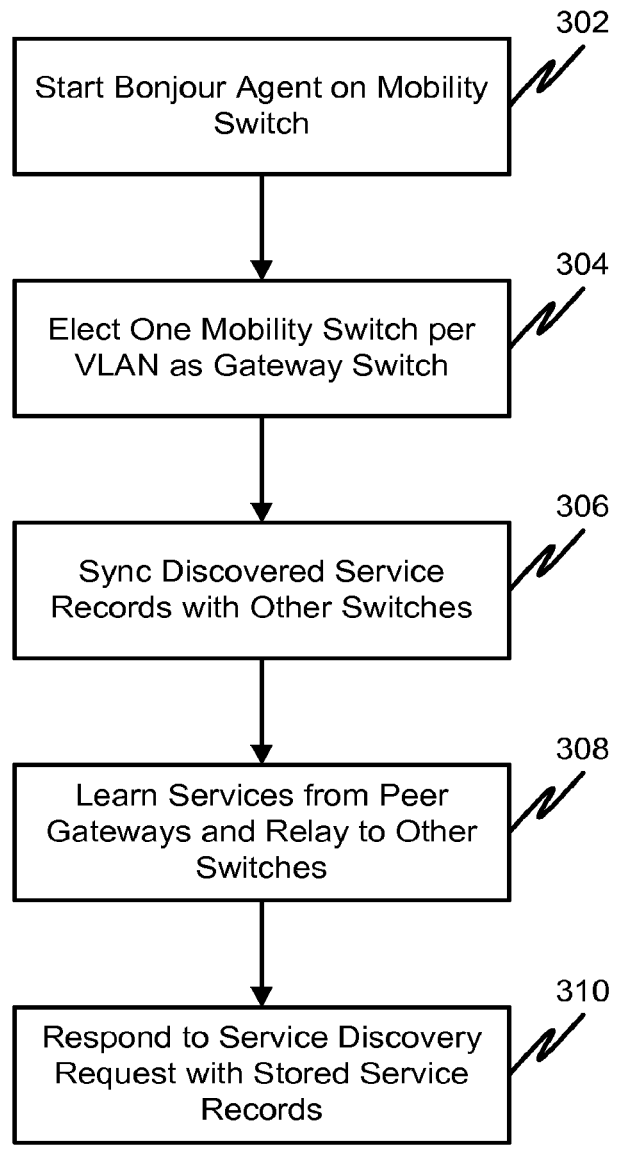
FIG. 3 is a flow chart of an example method for mDNS support in unified access networks in accordance with at least one implementation.

FIG. 3 is a flow chart of an example method for mDNS support in unified access networks. Processing begins at 302, where a Bonjour agent is started on a mobility switch (e.g., 106 or 108). Processing continues to 304.

At 304, one of the mobility switches is elected as the Bonjour gateway for each VLAN. The mobility switches can use any suitable method to elect or negotiate which one of the mobility switches will serve as the gateway. Processing continues to 306.

At 306, each Bonjour gateway syncs service records discovered on its respective VLAN with other mobility switches in the domain. Processing continues to 308.

At 308, when a Bonjour gateway learns of new services from peer gateways, it relays the service information to other switches on the VLAN for which it is the gateway. Processing continues to 310.

At 310, when a mobility switch receives a service discovery request (e.g., an mDNS request), the mobility switch responds with stored (or cached) service records.

It will be appreciated that 302-310 can be repeated in whole or in part.

Figure 4:
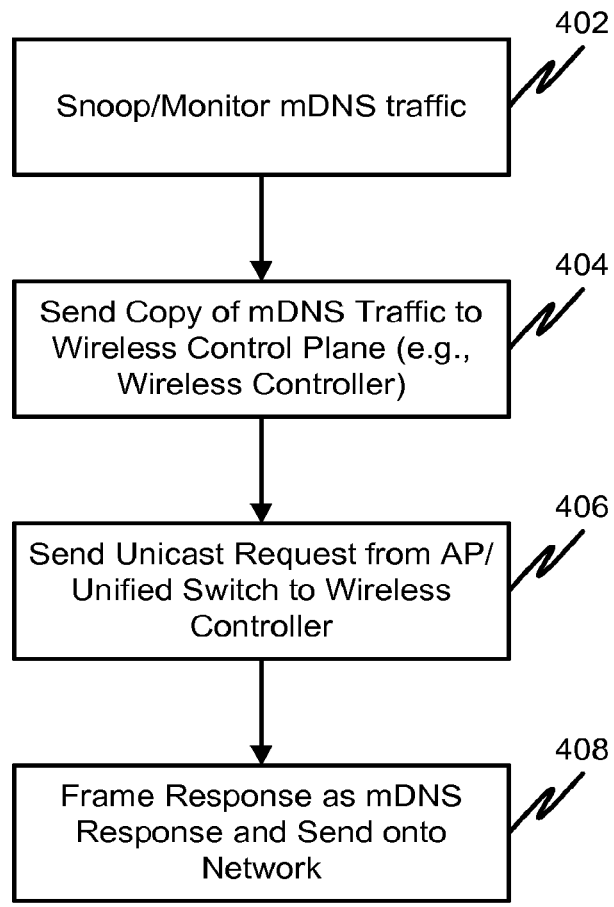
FIG. 4 is a flow chart of an example method for mDNS support in memory constrained devices in unified access networks in accordance with at least one implementation.

FIG. 4 is a flow chart of an example method for mDNS support in a memory constrained AP or unified switch. Processing begins at 402, where a memory constrained device (e.g., an AP or a unified switch) snoops or monitors mDNS traffic. Processing continues to 404.

At 404, the AP/unified switch sends a copy of snooped mDNS traffic to the wireless control plane (e.g., a wireless controller 102/104). Processing continues to 406.

At 406, the AP/unified switch sends a unicast request to the wireless controller when the AP/unified switch detects an mDNS query. Processing continues to 408.

At 408, the AP/unified switch frames the response from the wireless controller as an mDNS response and sends it onto the network.

It will be appreciated that 402-408 can be repeated in whole or in part.

Figure 5:
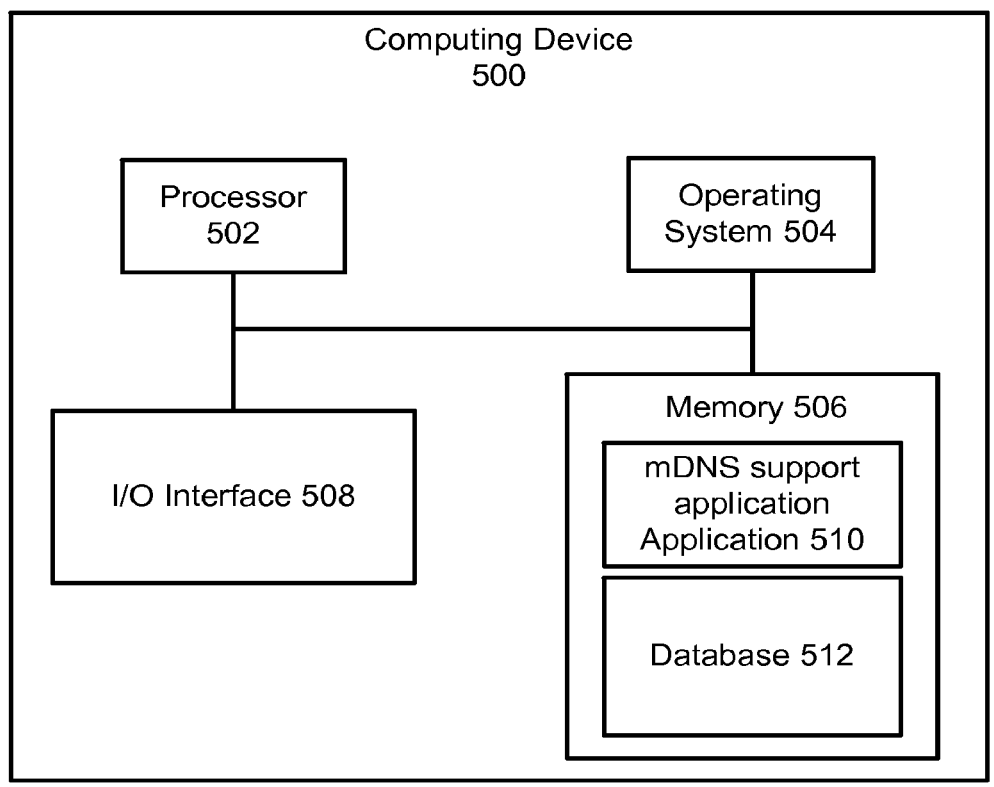
FIG. 5 is a diagram of an example computer system for mDNS support in unified access networks in accordance with at least one implementation.

FIG. 5 is a diagram of an example computer system 500 in accordance with at least one implementation. The computer 500 includes a processor 502, operating system 504, memory 506 and I/O interface 508. The memory 506 can include an mDNS support application 510 and a database 512 (e.g., for storing learned services or the like).

In operation, the processor 502 may execute the application 510 stored in the memory 506. The application 510 can include software instructions that, when executed by the processor, cause the processor to perform operations for network management in accordance with the present disclosure (e.g., performing one or more of steps 302-310 and/or 402-408).

The application program 510 can operate in conjunction with the database 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for mDNS support in unified access networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method for processing a service discovery request message, the method comprising:
   monitoring, at a first switch, the service discovery request message and responses to determine available services from a second switch using a synced service record, wherein the first switch and the second switch are peer switches and are in different virtual local area networks (VLANs);
   sending a copy of the available services to a wireless controller;
   detecting, at the first switch, a service discovery request;
   sending the service discovery request message from the first switch to the wireless controller requesting the available services;
   receiving a response from the wireless controller;
   determining a policy associated with the available services, wherein the policy is stored in a policy table at the first switch;
   framing the response in a service request protocol format; and
   based on the determined policy, relaying the available services in the framed response to other switches in a network, wherein the first switch and the other switches are in the same VLAN.

2. The method of claim 1, wherein the service discovery request message is a multicast Domain Name System (mDNS) message.

3. The method of claim 1, wherein sending the framed response comprises sending the framed response via a unicast message.

4. The method of claim 1, wherein the first switch comprises an access point.

5. The method of claim 1, wherein the first switch comprises a gateway switch.

6. The method of claim 1, wherein sending the framed response comprises determining, based on end user privileges, whether to send the framed response to the network.

7. A system for processing a service discovery request message, the system comprising control circuitry configured to:
   monitor, at a first switch, the service discovery request message and responses to determine available services from a second switch using a synced service record, wherein the first switch and the second switch are peer switches and are in different virtual local area networks (VLANs);
   send a copy of the available services to a wireless controller;
   detect, at the first switch, a service discovery request;
   send the service discovery request message from the first switch to the wireless controller requesting the available services;
   receive a response from the wireless controller;
   determine a policy associated with the available services, wherein the policy is stored in a policy table at the first switch;
   frame the response in a service request protocol format; and
   based on the determined policy, relay the available services in the framed response to other switches in a network, wherein the first switch and the other switches are in the same VLAN.

8. The system of claim 7, wherein the service discovery request message is a multicast Domain Name System (mDNS) message.

9. The system of claim 7, wherein the control circuitry is configured to send the framed response via a unicast message.

10. The system of claim 7, wherein the first switch comprises an access point.

11. The system of claim 7, wherein the first switch comprises a gateway switch.

12. The system of claim 7, wherein to send the framed response, the control circuitry is further configured to determine, based on end user privileges, whether to send the framed response to the network.

13. A non-transitory computer-readable medium having instructions stored thereon that, when executed by a processor, causes the processor to perform operations comprising:
   monitoring, at a first switch, a service discovery request message and responses to determine available services from a second switch using a synced service record, wherein the first switch and the second switch are peer switches and are in different virtual local area networks (VLANs);
   sending a copy of the available services to a wireless controller;
   detecting, at the first switch, a service discovery request;
   sending the service discovery request message from the first switch to the wireless controller requesting the available services;
   receiving a response from the wireless controller;
   determining a policy associated with the available services, wherein the policy is stored in a policy table at the first switch;
   framing the response in a service request protocol format; and
   based on the determined policy, relaying the available services in the framed response to other switches in a network, wherein the first switch and the other switches are in the same VLAN.

14. The non-transitory computer-readable medium of claim 13, wherein the service discovery request message is a multicast Domain Name System (mDNS) message.

15. The non-transitory computer-readable medium of claim 13, wherein for sending the framed response, the operations further comprise sending the framed response via a unicast message.

16. The non-transitory computer-readable medium of claim 13, wherein the first switch comprises an access point.

17. The non-transitory computer-readable medium of claim 13, wherein the first switch comprises a gateway switch.

18. The non-transitory computer-readable medium of claim 13, wherein for sending the framed response, the operations further comprise determining, based on end user privileges, whether to send the framed response to the network.

* * * * *